Sept. 29, 1959 W. HERTERICH 2,906,166
CONTROLLING MEANS OPERATABLE BY MEANS OF A
PHOTO-ELECTRIC CELL AND MOVING COIL SYSTEM
Filed June 30, 1954 2 Sheets-Sheet 1

INVENTOR.
WALTER HERTERICH
BY K. A. Mayr
ATTORNEY

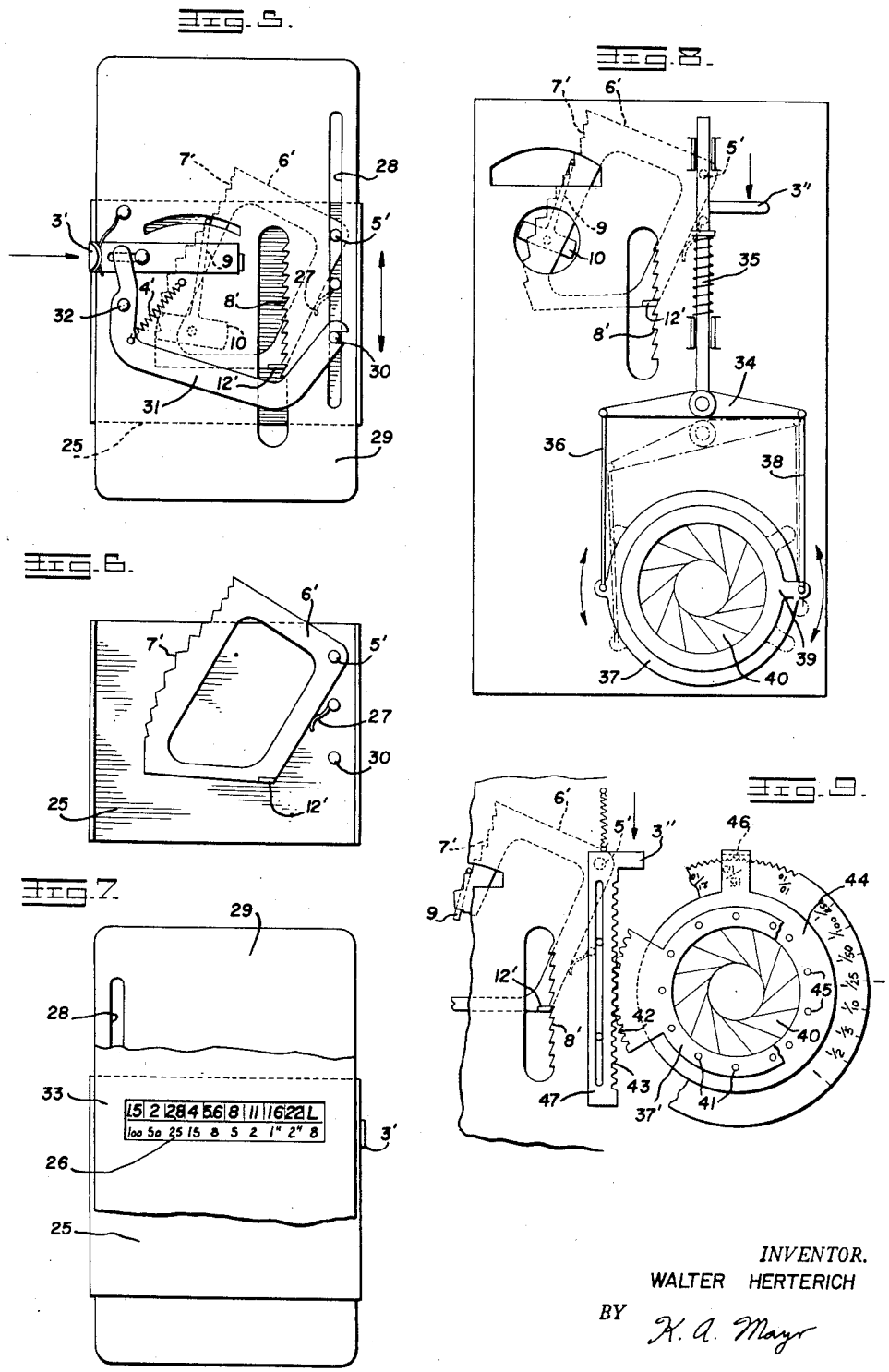

United States Patent Office 2,906,166
Patented Sept. 29, 1959

2,906,166

CONTROLLING MEANS OPERATABLE BY MEANS OF A PHOTO-ELECTRIC CELL AND MOVING COIL SYSTEM

Walter Herterich, Dachau, Germany

Application June 30, 1954, Serial No. 440,495

Claims priority, application Germany July 3, 1953

8 Claims. (Cl. 88—23)

The present invention relates to light meters operating with a photoelectric cell and a moving coil system and adapted to be used in combination with photographic cameras.

Controlling devices for cameras are known, in which devices the pointer of a moving coil system provided with a photoelectric cell is scanned by a toothed element which is urged against the pointer by a spring adapted for tensioning from the outside of the device, and which controls an adjusting means of a photographic device, for example the diaphragm or shutter or both according to the intensivity of the light.

The invention relates to controlling devices of this kind which, if compared with known structures, have the advantage that they relieve almost completely the pointer as well as the sensitive moving coil system from all stresses caused by forces necessary for the adjustment of the diaphragm or the shutter, etc., and acting upon the means of transmission, and that they thereby increase the precision and the capability of the controlling means to react to the indications of the photocell.

A further advantage of the controlling means of the invention resides in their operating reliability as well as in their simplicity and stability.

The invention resides principally in the fact that the scanning element is tiltably supported and has not only steps or teeth adapted to be engaged by the pointer of the moving coil system, but has also a tooth or teeth adapted to engage locking teeth or a tooth mounted on or forming part of a frame whenever the scanning element is tilted due to engagement with the pointer, whereby the pointer is relieved and the scanning element is arrested.

In this way it is possible to provide more substantial and more powerful locking means and to absorb much greater stresses than is possible with conventional constructions in which the controlling movements have to be initiated through locking of the pointer or its weak moving coil system, whereas, according to the present invention, the pointer has to absorb merely the feeble turning moment required for tilting the scanning element. This tilting moment is, compared with the controlling forces of the rest of the mechanism, insignificantly small.

Additional features and advantages of the invention will be understood from a consideration of the following detailed description taken in connection with the accompanying drawings, forming a part of this specification and in which several embodiments of the invention are shown by way of example. However, the invention is not confined to any strict conformity with the showing of the drawings, but may be changed or modified, so long as such changes or modifications mark no material departure from the salient features of the invention as expressed in the appended claims.

In the drawings, in which like or identical parts are referred to by the same reference numerals in all of the several figures, Figure 1 is a front view of a first embodiment of the invention, the scanning element being in tensioned position prior to the commencement of its scanning movement;

Figure 5 is a rear diagrammatic illustration of the interior of another embodiment of the invention as applied to an exposure meter;

Figure 6 is a detail view of the scanning element and of its support as used in the device shown in Figure 5;

Figure 7 is a front view of the exposure meter of Figure 5; and

Figures 8 and 9 show two embodiments of the invention in combination with exposure adjusting elements on a camera.

Figure 1:
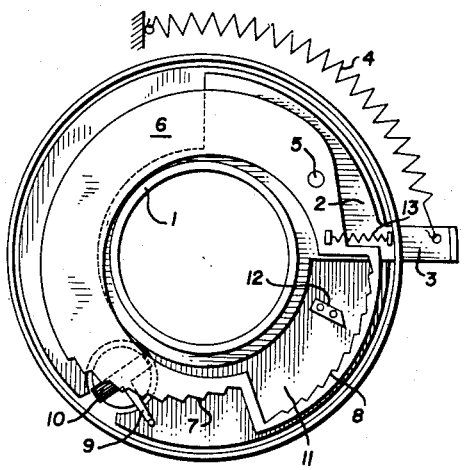
Figure 3:
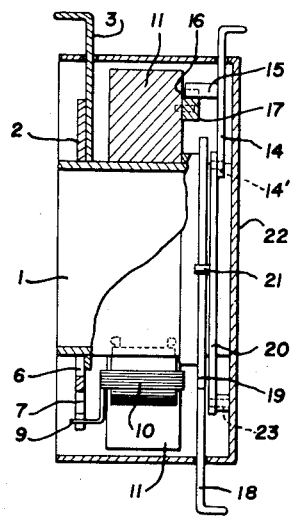
Figure 3 is a side view, partly in section, of the controlling device shown in Figure 1.

The first embodiment of the invention is directed to an actuating mechanism for the shutter and/or diaphragm of a camera wherein adjusting elements encircle the objective tube. The camera includes a photocell (not shown) for measuring the light intensity of an area to be photographed, the photocell providing electrical energization for adjusting the camera mechanism as described hereinafter.

In this first embodiment of the invention illustrated in Figures 1 to 4, a guide ring 2 is rotatably arranged around the objective tube 1 of a camera and provided with a handle 3 for rotatably shifting it. The ring 2 is coupled to the adjusting member for the time of exposure, for example, to the ring of an objective shutter and is acted on by a tension spring 4. The ring 2 carries a pin 5 swingably supporting a substantially annular scanning member 6, which is provided with two rows of teeth 7 and 8. The rows of teeth 7 and 8 cooperate in scanning relationship with the outwardly bent end portion of a pointer 9 and a locking tooth 12, respectively, in a manner to be described hereinafter. Positioned in the rear of the scanning member 6 is a moving coil system 10 including the angular pointer 9 and a ring-shaped permanent magnet 11. The moving coil system is electrically energized by a photocell and the pointer, when free to rotate, assumes a position dependent on the light intensity on the photocell.

In the operation of the first embodiment to adjust camera shutter speed, the handle 3 of ring 2 is initially moved clockwise, as seen in Figure 1, to a stop (not shown) and then released for return movement by spring 4. While the handle is against the stop and before its return movement, the teeth 7 are disposed so as not to interfere with movement of the pointer called for by the photocell. During the return movement, the scanning member 6 rotates, together with ring 2, in counter-clockwise direction about the axis of the objective tube 1 until a tooth of its row of teeth 7 touches the pointer 9 and thereby stops the rotation of the scanning member in counter-clockwise direction.

Figure 2:
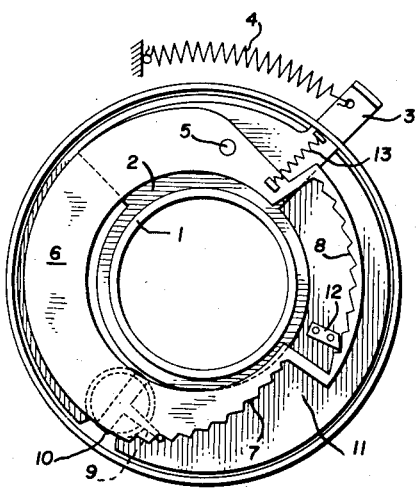
Figure 2 is a front view of the controlling device shown in Figure 1 in the position after the scanning of the position of the pointer, and after the scanning element has been locked in position.
Figure 4:
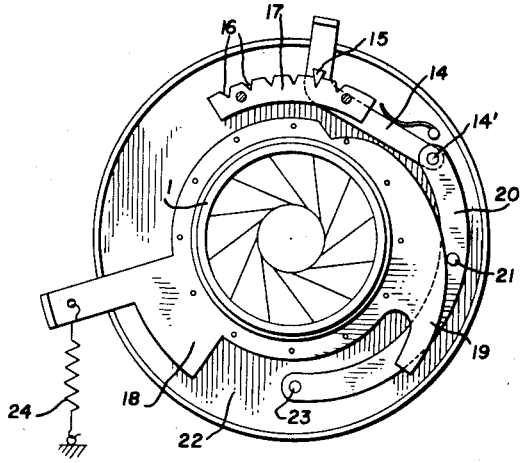
Figure 4 is a view of the interior of the device shown in Figure 1 after removal of the magnet and moving coil system.

As, however, the guide ring 2, owing to the pull of the spring 4, continues its rotation in counter-clockwise direction about the objective tube 1, the scanning member 6 is forced to rotate about its point of contact with the pointer 9 until one of the second row of teeth 8 moves into engagement with locking tooth 12 provided on the magnet 11. The flanks of the teeth of the row of teeth 8 are so inclined toward the center of the scanning member 6 that, upon complete engagement of the locking tooth 12 with a tooth of the row of teeth 8, the pointer 9 is relieved of the pressure of the row of teeth 7 and released by the latter. One locking position of member 6 is illustrated in Figure 2.

In this position the pointer 9 is released, and continuation of the rotation of the scanning member is now prevented by the locking engagement of the elements 8 and 12. A spring 13, arranged between the scanning member and the guide ring 2, prevents the row of teeth 8 from entering into locking engagement with the locking tooth 12 before the rotation of the scanning member has been arrested by the pointer 9.

Without departing from the scope of the invention, the locking tooth 12 and the row of teeth 8 can be interchanged, in which case the locking tooth 12 is mounted on the scanning member 6, whereas the row of teeth is rigidly secured to the magnet 11.

The rows of teeth 7 and 8 of the scanning member 6 are preferably so designed that every doubling of the luminous intensity acting upon the photoelectric cell (which during the actuation of the device must be turned towards the object to be photographed) has the result that the point of engagement of the pointer at teeth 7 is advanced one tooth and similarly the next adjacent tooth of the row of teeth 8 of the scanning member 6 is moved into locking engagement with the locking tooth 12, the resulting movement of ring 2 and handle 3, for each doubling, reducing the setting of the time of exposure of the shutter by one half.

The aforedescribed structure suffices for the adjustment of the correct time of exposure of a camera, provided that the size of the opening of the diaphragm of the objective is not changed and that the sensitiveness of the film remains the same. Under the aforesaid conditions, the correct time of exposure will, therefore, automatically adjust itself when the handle 3 is moved in clockwise direction and then released until the row of teeth 8 has moved into locking engagement with the locking tooth 12.

In order to also take into account the setting of the diaphragm and the sensitiveness of the film, the magnet 11 with the moving coil system 10 and the locking tooth 12 may be rotated about the axis of the objective tube 1. Such rotation may take place, in a manner described hereinafter, after locking engagement of tooth 12 with one of the teeth 8. The degree of movement of magnet 11 is determined by the amount of further rotation of ring 2 that is necessary to adjust the shutter speed to compensate for a change in diaphragm setting to maintain proper exposure in conformity with the light intensity measured by the photocell.

In case of uniform graduation of the diaphragm scale of the camera (see Figure 4), the diaphragm setting member may be pivoted at 14' to a link 14. The link 14 connects the shutter and diaphragm adjusting mechanisms so they are correlated to provide proper exposure. The link 14 carries a nose 15 which in conformity with the sensitiveness of the film can be manually adjusted to engage one of the notches 16 of the member 17 which is fastened at the magnet 11 (see Figure 3) and accordingly permit adjustment of the diaphragm without changing the shutter speed.

In case of non-uniform graduation of the diaphragm scale, the path of the diaphragm setting member must be corrected. This is effected (according to Figure 4) by means of a ring 18, which is connected to the diaphragm setting lever, and which carries a controlling cam 19, against which rests a pin 21 provided on a guide member 20. The guide member 20 swings about a stationary pivot 23, mounted, for example, on the inside of a back-wall 22, the other end of the member 20 being connected by means of the pivot 14' with the lever 14. A spring 24 rotates the ring 18 in such manner that the controlling cam 19 always bears against the pin 21.

When a tooth of the row of teeth 8 is in locking engagement with the locking tooth 12 (see Figure 2), a slight rotation of the handle 3 in clockwise direction (shortening of the time of exposure) will cause the magnet 11 to rotate in the same direction due to the tension of a spring 24 which biases ring 18 counterclockwise and acts through the cam 19, pin 21, guide member 20 and link 14. The cam swings member 20 in the clockwise direction about pivot 23 to, in turn, pull the magnet 11 via the link 14 and member 17. The resulting counter-clockwise rotation of ring 18 causes an opening of the diaphragm.

In a similar way, a corresponding lengthening of the time of exposure can be effected through rotation of the ring 18 (Figure 4) in clockwise direction (closing of the diaphragm), whereupon by the pull of the spring, the magnet 11 is rotated, via the guide ring 2, the pivot 5 and the parts 8 and 12, counter-clockwise when the cam 19 permits the pin 21 on guide member 20 to move inwardly under the pull of the spring 4 transmitted via the parts 11, 17 and 14 to the guide member 20.

It is possible, therefore, as long as the device remains in locked condition, that is to say, as long as a tooth of the row of teeth 8 is in locking engagement with the locking tooth 12, to adjust the time of exposure and the diaphragm in a desired manner, whereby, however, both values depend upon each other to such an extent that the exposure is always correct.

When the rotation of the handle 3 in clockwise direction is continued, the scanning member 6 moves out of its locking engagement with the locking tooth 12 and, after release of the handle 3, adjusts itself to the new value of exposure. The movement of the handle 3 may be coupled to the conventional winding key or to the film transport.

The controlling device, which, in the modification shown in Figures 1 to 4 is positioned in front of or behind the shutter, can also be arranged laterally of the shutter, whereby the transmission of the rotatory motion for diaphragm and shutter is effected, for example, by levers or toothed wheels.

For moving picture cameras, the adjustment of the time of exposure is unnecessary. Here, the controlling means would have to adjust merely the setting of the diaphragm which, if necessary, might be corrected by a cam similar to that of the ring 18 to provide linearization of the diaphragm. Through rotational movement of the moving coil system about the objective tube 1 (Figure 1), the sensitiveness of the film and the frequency of picture change might be taken into account.

In the embodiment shown in Figures 5 to 7, the scanning member is guided in straight-lined fashion, and the locking tooth 12' is provided on the scanning member. The second row of teeth 8' corresponding to teeth 8 in Figures 1 and 2 is on a straight line and stationary.

This embodiment is particularly suited for exposure meters, whereby it is unimportant whether the exposure meter is of the pocket type, or is mounted in or arranged on a camera. This arrangement has the advantage that the path of scanning movement of the scanning member along which it may be locked can be lengthened relative to the tilting locking movement of the scanning member, and that the scanning member can be directly coupled to a time indicating slide of the exposure meter as described hereinafter.

In the structure according to Figures 5 and 7, the scanning member 6' is, for the sake of weight-saving, designed as a frame whose front edge is provided with scanning teeth 7', which may be on a curved line, if desired, and whose upper tooth-flanks are curved to suit the circular path of the end of the pointer 9 of the moving coil system 10. Provided on the scanning member 6' is a locking tooth 12', for instance, at the lower right corner of the frame (see Figures 5 and 6). The reference numeral 5' designates the pivot of the scanning member 6'. The pivot 5' is fastened on a slide 25, carrying on its front side in rows beneath each other the scales of the duration of exposure or of the settings of the diaphragm. Figure 7 shows the exposure meter with such a scale 26 in position to be seen through a slot of the outer wall 33 with a further scale on the latter along the slot for indicating appropriate F stop numbers for each of the exposure times on scale 26.

The scanning member 6' is urged to swing clockwise on the pin 5' by a spring 27 on slide 25. The pin 5' is guided in a vertical slot 28 provided in a wall 29 of the body of the exposure meter or of a camera, if the meter is combined with a camera. Likewise guided in the slot 28 is a second pin 30 which is also mounted on the slide 25 and which is engaged by a bent lever 31 which is controlled by a handle 3'. The lever 31 is rotatably mounted on a pin 32, fastened on the wall 29, and is urged to swing counterclockwise by a spring 4', one end of which is connected with the wall 29. The handle 3' is in the form of a push button adapted to engage and actuate the shorter upper arm of the lever 31. A portion of the handle or push-button 3' at the left end thereof, as seen in Figure 5, is engageable with the upper end of the lever 31 to actuate the latter in operating the scanning mechanism. In the position indicated in Figure 5, the lever 31 has been rotated clockwise by the push-button 3' and locked in a position near the extreme end of its pivotal clockwise movement by engagement of the tooth 12' of the scanning member with one of the lowermost teeth 8' on wall 29 in the manner described hereinafter. Accordingly, the curved portion of the push-button 3' which is engageable with the end of the lever 31 is shown in spaced relationship therefrom inasmuch as the push-button has been returned by its biasing spring to its initial position.

The second row of teeth 8' intended for locking engagement with the locking tooth 12' is provided in a straight slot in the wall 29 which, in cooperation with the outer wall 33 which is spaced from the wall 29, provides a guide-passage for the scanning member 6' which is positioned between the two walls. In scanning, tooth 12' slides along the left side of this straight slot.

The operation of this second embodiment of the controlling device is similar to that shown in Figures 1 to 4. Pressure exerted on the push button 3' displaces, via the lever 31, the scale slide 25 as well as the pivot 5' of the scanning member 6' in downward direction. Upon release of the push button 3', the actuating means 31, 25, 5' are pulled upward by the action of spring 4' so that a tooth 7' of the scanning member engages the pointer 9. Thereby the scanning member 6' is tilted in counter-clockwise direction until its locking tooth 12' engages a tooth of the second tooth row 8', whereby the scanning member is locked, and the position of the scale slide 25 is adjusted. This position is shown in Figure 5. The pointer 9 is thereby released, and the time of exposure for the respective focal distance shown thereabove can be read on the scale 26.

It may be added that the two rows of teeth 7' and 8' can be interchanged in such manner that the scanning member with its row of teeth 7' is stationary, whereas the row of teeth 8' is movably arranged.

It may further be mentioned that for the slide 25 a rotatable disk for the scale 26 can be substituted, in which case the bent lever 31 may actuate a gearing.

For the shutter of a linearized diaphragm an arrangement as illustrated in Figure 8 may be employed. A balance beam 34 actuates via a connecting rod 35, on one side by means of a guide rod 36 a diaphragm ring 37, and, on the other side by means of another guide rod 38 a time-adjuster 39, whereby as in the structure shown in Figure 9 the sensitiveness of the film may be taken into account. A scanning member 6' is pivoted at 5' to spring-loaded connecting rod 35, whose actuation is effected through pressure exerted on a finger 3''.

The device shown in Figure 8 operates in such manner that opening of the diaphragm correspondingly shortens the time of exposure, provided that the scanning member 6' and the rod 35 remain at rest. If, however, the position of the latter is changed, as indicated in dotted lines, the ratio: diaphragm opening-time, will change in conformity with the light intensity.

In some cases it is preferred to avoid rotation of the magnet system with the moving coil. In the embodiment shown in Figures 1 to 4 this can be accomplished by the mechanical arrangement of a linearized diaphragm between the lever 3 and the ring of the objective shutter, for example, in such manner that one of the pin-circles or hole-circles of the diaphragm is connected to the setting lever 3, whereas the other pin-circle or hole-circle is connected to the shutter ring of the objective shutter, which then is directly coupled to the lever 3. Such a mechanism is shown in Figure 9, and has the advantage of greatest simplicity.

As shown in Figure 9, the diaphragm ring 37' provided with pins 41 which are arranged in a circle is actuated through actuating means 47 including a gearing 42, 43 by a scanning member 6' and is locked against rotation in the position defined by the pointer of the instrument. The position of a second annular member 44 having pins or holes arranged on the circle of the pins 45 is made dependent upon the time of exposure and the sensitiveness of the film. This is accomplished by providing the member 44 with a catch 46 which in conformity with the sensitiveness of the film engages in different notches of the time-ring of the diaphragm shutter.

What I claim as new is:

1. An actuating mechanism for photometric apparatus utilizing a photocell for recording an indication of a light condition measured by the photocell comprising, a support means, a pointer mounted for movement on said support means, an electrically-responsive system energizable by said photocell for positioning said pointer relative to said support means in dependence on said light condition, a scanning member, means for mounting said scanning member on said support means for pointer-scanning movement in a direction generally normal to the direction of movement of said pointer by said system and along a path in which a portion of said scanning member is engageable with said pointer, means for biasing said scanning member in a predetermined direction relative to said mounting means, said mounting means also providing for tilting movement of said member in opposition to said biasing means when said portion engages said pointer during scanning movement along said path, parts on each of said scanning member and said support means engageable in response to said tilting movement for stopping said scanning member in one of a plurality of different positions dependent on the degree of energization of said system and the corresponding position of said pointer to lock said mounting means in a related position as a recorded indication of a light condition and to limit the forces applied to said pointer by said scanning member substantially to only those forces required to tilt the latter against said biasing means.

2. A mechanism as defined in claim 1, wherein said system includes a moving coil for actuating said pointer, said mounting means including an actuating means for manipulating said scanning member, a pivot connection between said scanning member and said actuating means, and a spring biasing said actuating means relative said support means toward a predetermined position.

3. An actuating mechanism as defined in claim 1, in which said portion of said scanning member includes a plurality of steps adapted to be engaged by said pointer, said support means including a part adapted to be engaged by said part of said scanning member, one of said parts including a plurality of teeth and gaps therebetween and the other of said parts being in the form of a tooth adapted to be inserted in said gaps.

4. An actuating mechanism as defined in claim 1, in which said portion of said scanning member includes a plurality of steps adapted to be engaged by said pointer, said upport means including a portion having a plurality of teeth and gaps therebetween, said part of said scanning member being in the form of a tooth adapted to be received in said gaps.

5. An actuating mechanism as defined in claim 2, wherein said biasing means includes resilient means interposed between said actuating means and said scanning member for yieldingly holding the latter in a desired relative position with respect to said actuating means.

6. An actuating mechanism as defined in claim 2, including guide means for said actuating means in the form of a straight slot in said support means, said pivot connection being slideable in said slot.

7. An actuating mechanism as defined in claim 2, in which said actuating means include a slide slideable on said support means, a scale provided on said slide, said pivot connection being mounted on said slide.

8. An actuating mechanism as defined in claim 2, in which said actuating means include a lever, said support means carrying a movable push-button positioned to engage and move said lever to operate the mechanism.

References Cited in the file of this patent

UNITED STATES PATENTS

| | | |
|---|---|---|
| Re. 21,034 | Karg | Mar. 21, 1939 |
| 2,058,531 | Tuttle | Oct. 27, 1936 |
| 2,150,365 | Dziewor | Mar. 14, 1939 |
| 2,226,602 | Frost | Dec. 31, 1940 |
| 2,242,013 | Martin | May 13, 1941 |

FOREIGN PATENTS

| | | |
|---|---|---|
| 806,416 | France | Sept. 21, 1936 |
| 813,193 | France | Feb. 22, 1937 |
| 850,239 | France | Sept. 4, 1939 |
| 147,358 | Austria | Oct. 26, 1936 |
| 664,627 | Germany | Aug. 31, 1938 |
| 894,197 | Germany | Oct. 22, 1953 |